(12) United States Patent
Wada

(10) Patent No.: US 7,849,471 B2
(45) Date of Patent: Dec. 7, 2010

(54) SERVER APPARATUS, METHOD FOR CONTROLLING THE SERVER APPARATUS, RELATED CONTROL PROGRAM, AND STORAGE MEDIUM STORING THE PROGRAM

(75) Inventor: Katsuhiro Wada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1111 days.

(21) Appl. No.: 11/466,845

(22) Filed: Aug. 24, 2006

(65) Prior Publication Data

US 2007/0143473 A1    Jun. 21, 2007

(30) Foreign Application Priority Data

Aug. 31, 2005    (JP) .............................. 2005-252301

(51) Int. Cl.
*G06F 3/00* (2006.01)
*G06F 15/16* (2006.01)

(52) U.S. Cl. ...................................... 719/328; 709/206

(58) Field of Classification Search ................. 719/318; 709/206
See application file for complete search history.

(56) References Cited

U.S. PATENT DOCUMENTS

| | | | | |
|---|---|---|---|---|
| 5,925,108 A | * | 7/1999 | Johnson et al. ............. | 719/318 |
| 6,842,877 B2 | * | 1/2005 | Robarts et al. ............. | 715/708 |
| 6,854,007 B1 | * | 2/2005 | Hammond .................. | 709/206 |
| 7,085,595 B2 | * | 8/2006 | Kitchin ...................... | 455/574 |

FOREIGN PATENT DOCUMENTS

JP    09-292959 A    11/1997

OTHER PUBLICATIONS

Xianghua Deng, Model-Checking Middleware-Based Event-Driven Real-Time Embedded Softwre, 2002.*
PrintBasic:1 Service Template Version 1.01, Microsoft Corporation, p. 1-p.42, Aug. 8, 2006.

* cited by examiner

*Primary Examiner*—Lechi Truong
(74) *Attorney, Agent, or Firm*—Canon U.S.A., Inc. I.P. Division

(57) ABSTRACT

An event notification method for a server apparatus configured to notify a client apparatus of generated events, includes setting an event notification rate indicating the interval of notification notifying generated events, and determining an event to be notified to the client apparatus among events generated within a unit time corresponding to the event notification rate being set, with reference to priority information corresponding to the generated events.

15 Claims, 12 Drawing Sheets

FIG.3

```
<s:Envelope ... >
  <s:Header ... >
    <wse:Action>
        http://schemas. xmlsoap. org/ws/2004/08/eventing/Subscribe
    </wse:Action>
    . . .
  </s:Header>
  <s:Body ... >
    <wse:Subscribe ... >
        <wse:EndTo> endpoint-refernce </wse:EndTo> ?
        <wse:Delivery Mode="xs:anyURI" ?> xs:any </wse:Delivery>
        <wse:Expires> [xs:dateTime | xs:duration] </wse:Expires> ?
        <c:EventRate Rate="3000ms">
        <c:priority Type_1st="JobLog", Type_2nd="ImpressionCount">
    </wse:Subscribe>
  </s:Body >
</s:Envelope>
```

FIG.4

| ADDRESS (CLIENT IP, PORT) | EVENT NOTIFICATION RATE | FIRST PRIORITY EVENT | SECOND PRIORITY EVENT |
|---|---|---|---|
| 192.168.10.100: 1028 | 3000 msec | JOB LOG | IMPRESSION |

| | GENERATION TIME 501 | EVENT TYPE 502 | STATUS 503 |
|---|---|---|---|
| 1 | 15:34:20.113 | DEVICE STATUS | SLEEP RELEASED |
| 2 | 15:34:20.322 | JOB STATE TRANSITION | PRINT STARTED |
| 3 | 15:34:21.135 | JOB STATE TRANSITION | PRINT FINISHED |
| 4 | 15:34:21.288 | IMPRESSION | 1ST PAGE |
| 5 | 15:34:21.328 | DEVICE STATUS | NO PAPER IN FIRST CASSETTE |
| 6 | 15:34:22.332 | JOB STATE TRANSITION | PRINT STARTED |
| 7 | 15:34:22.332 | DEVICE STATUS | NO PAPER IN THIRD CASSETTE |
| 8 | 15:34:22.576 | DEVICE STATUS | JAM |
| 9 | 15:34:22.613 | JOB LOG | NEAR UPPER LIMIT OF LOG |
| 10 | 15:34:22.913 | DEVICE STATUS | SLEEP |

FIG.7

```
<s:Envelope . . . >
  <s:Header . . . >
    <wse:Action>
        http://schemas. xmlsoap. org/ws/2004/08/eventing/Subscribe
    </wse:Action>
    . . .
  </s:Header>
  <s:Body . . . >
    <wse:Subscribe . . . >
        <wse:EndTo> endpoint-refernce </wse:EndTo> ?
        <wse:Delivery Mode="xs:anyURI" ?> xs:any </wse:Delivery>
        <wse:Expires> [xs:dateTime | xs:duration] </wse:Expires> ?
        <wse:Filter Dialect="xs:anyURI"?> xs:any </wse:Filter> ?
        <c:EventRate Rate="3000"ms>
        <c:priority State_1st="JobState:complete", State_2nd="JobState:any">
    </wse:Subscribe>
  </s:Body >
</s:Envelope>
```

FIG.8

| ADDRESS (CLIENT IP, PORT) | EVENT NOTIFICATION RATE | FIRST PRIORITY EVENT /STATUS | SECOND PRIORITY EVENT /STATUS |
|---|---|---|---|
| 192.168.10.100: 1028 | 3000 msec | JOB STATE TRANSITION : PRINT FINISHED | JOB STATE TRANSITION : ANY |

| USER | UPPER LIMIT OF EVENT NOTIFICATION RATE |
|---|---|
| IT Admin 001 | 500 msec |
| OA DEVICE ADMINISTRATOR | 1000 msec |
| John Doe | 10000msec |
| Tanaka Ichiro | 10000msec |
| Sasaki Hanako | 10000msec |

SERVER APPARATUS, METHOD FOR CONTROLLING THE SERVER APPARATUS, RELATED CONTROL PROGRAM, AND STORAGE MEDIUM STORING THE PROGRAM

BACKGROUND OF THE INVENTION

1. Field of the Invention

The present invention relates to a network system including a server apparatus and a client apparatus.

2. Description of the Related Art

Widespread use of the Internet is promptly increasing the number of various network compatible devices other than conventional personal computers, such as user interactive devices including portable telephones and PDA (Personal Digital Assistance), and image processing devices including scanners, printers, copying machines, and digital cameras, as well as general appliances including television receivers, air-conditioning devices, and refrigerators.

These network compatible devices require application software, various protocols, and architectures for the event control and display (e.g., event registration, event notification, and deletion of registered event).

Furthermore, some companies and standardization groups are working out standardized specifications for the network compatible devices considering the expansion of the event registration, event notification, and deletion of registered event, such as UPnP (registration trademark) and WSD: Web Services for Devices (WS-Eventing) proposed by Microsoft Corporation and others, or BMLinkS proposed by Japan Business Machine and Information system Industries Association (JBMIA).

Furthermore, according to a conventional technique, it is possible to define, beforehand, a variable to be notified when a registered event value changes. When the variable is "thinned" out, its thinning rate can be defined beforehand. For example, when the "JobMediaSheetCompleted" event is generated, it is possible to generate an event at the intervals of 5 seconds and notify the generated event at predetermined timing instead of promptly notifying the event. However, regardless of product performances, the conventional event notification rate is unequivocally defined as part of the specifications.

According to the above-described conventional technique, using an event enables a user to promptly update the information. However, the conventional network compatible devices are configured to transmit all of the registered events. Thus, a heavy burden will be placed on the network compatible devices as well as on the client devices receiving the events.

Furthermore, the network will suffer heavy traffic due to increased network compatible devices. Furthermore, according to the conventional "event thinning technique", the event notification interval is fixed to a constant value. In other words, the mutual difference of events in importance or performances of individual products generating the events are not taken into consideration.

Therefore, each system cannot appropriately determine the event to be notified considering the type and the number of generated events. Thus it would be desirable to provide a technique capable of overcoming or at least mitigating the above-described problems which can reduce a load of the apparatus connected to a network, and traffic of the network, while keeping the convenience for a user

SUMMARY OF THE INVENTION

The present invention is directed to a technique capable of overcoming or at least mitigating the above-described problems which can reduce a load of the apparatus connected to a network, and traffic of the network, while keeping the convenience for a user.

At least one exemplary embodiment is directed to a server apparatus, including an event registration message reception unit, an event notification rate determination unit, an event notification rate storage unit, and an event notification unit. The event registration message reception unit can receive, from a client apparatus connected via a network, an event registration message relating to registration of an event to be notified. The event notification rate determination unit can determine an event notification rate to be registered based on an event notification rate relating to the interval of events to be notified, included in the event registration message. The event notification rate storage unit can store, into a storage apparatus, the event notification rate determined by the event notification rate determination unit and priority information relating to priority of an event to be notified, included in the event registration message, based on destination information of the client apparatus to which the event is notified. And, the event notification unit can notify the client apparatus of information relating to an event having high priority among events generated within a time corresponding to the event notification rate, based on the event notification rate stored in the storage apparatus, the priority information, and the destination information of the client apparatus.

Furthermore, at least one exemplary embodiment is directed to a server apparatus configured to notify a client apparatus of generated events, including a setting unit and a determination unit. The setting unit can set an event notification rate indicating the interval of notification notifying generated events. The determination unit can determine an event to be notified to the client apparatus among events generated within a unit time corresponding to the event notification rate being set by the setting unit, with reference to priority information corresponding to the generated events.

Furthermore, at least one exemplary embodiment is directed to an event notification method for a server apparatus connected via a network to a client apparatus. The method may include receiving, from a client apparatus, an event registration message relating to registration of an event to be notified; determining an event notification rate to be registered based on an event notification rate relating to the interval of events to be notified, included in the event registration message; storing, into a storage apparatus, the event notification rate determined in the event notification rate determination step and priority information relating to priority of an event to be notified, included in the event registration message, based on destination information of the client apparatus to which the event is notified; and notifying the client apparatus of information relating to an event having high priority among events generated within a time corresponding to the event notification rate, based on the event notification rate stored in the storage apparatus, the priority information, and the destination information of the client apparatus.

Furthermore, at least one exemplary embodiment is directed to an event notification method for a server apparatus configured to notify a client apparatus of generated events, including setting an event notification rate indicating the interval of notification notifying generated events; and determining an event to be notified to the client apparatus among events generated within a unit time corresponding to the event notification rate being set in the setting step, with reference to priority information corresponding to the generated events.

Moreover, at least one exemplary embodiment is directed to an event notification system including a server apparatus and a client apparatus connected via a network. The client apparatus includes an event registration message transmission unit configured to transmit, to the server apparatus, an event registration message relating to registration of an event to be notified. The server apparatus includes an event registration message reception unit configured to receive, from the client apparatus, the event registration message; an event notification rate determination unit configured to determine an event notification rate to be registered based on an event notification rate relating to the interval of events to be notified, included in the event registration message; an event notification rate storage unit configured to store, into a storage apparatus, the event notification rate determined by the event notification rate determination unit and priority information relating to priority of an event to be notified, included in the event registration message, based on destination information of the client apparatus to which the event is notified; and an event notification unit configured to notify the client apparatus of information relating to an event having high priority among events generated within a time corresponding to the event notification rate, based on the event notification rate stored in the storage apparatus, the priority information, and the destination information of the client apparatus.

Additionally, at least one exemplary embodiment is directed to a computer readable medium containing computer-executable instructions to be executed in a server apparatus configured to notify a client apparatus of generated events. Here, the computer readable medium includes computer-executable instructions for receiving, from a client apparatus connected via a network, an event registration message relating to registration of an event to be notified; computer-executable instructions for determining an event notification rate to be registered based on an event notification rate relating to the interval of events to be notified, included in the event registration message; computer-executable instructions for storing, into a storage apparatus, the event notification rate determined by the event notification rate determination unit and priority information relating to priority of an event to be notified, included in the event registration message, based on destination information of the client apparatus to which the event is notified; and computer-executable instructions for notifying the client apparatus of information relating to an event having high priority among events generated within a time corresponding to the event notification rate, based on the event notification rate stored in the storage apparatus, the priority information, and the destination information of the client apparatus.

Furthermore, at least one exemplary embodiment is directed to a computer readable medium containing computer-executable instructions to be executed in an apparatus configured to notify a client apparatus of generated events. The computer readable medium includes computer-executable instructions for receiving, from a client apparatus connected via a network, an event registration message relating to registration of an event to be notified; computer-executable instructions for determining an event notification rate to be registered based on an event notification rate relating to the interval of events to be notified, included in the event registration message; computer-executable instructions for storing, into a storage apparatus, the event notification rate determined by the event notification rate determination unit and priority information relating to priority of an event to be notified, included in the event registration message, based on destination information of the client apparatus to which the event is notified; and computer-executable instructions for notifying the client apparatus of information relating to an event having high priority among events generated within a time corresponding to the event notification rate, based on the event notification rate stored in the storage apparatus, the priority information, and the destination information of the client apparatus.

Further features and aspects of the present invention will become apparent from the following detailed description of the numerous exemplary embodiments with reference to the attached drawings.

BRIEF DESCRIPTION OF THE DRAWINGS

The accompanying drawings, which are incorporated in and constitute a part of the specification, illustrate embodiments, features and aspects of the present invention and, together with the description, serve to explain the principles of the invention.

FIG. 3 is one example of a Subscribe message in accordance with the first exemplary embodiment.

FIG. 4 is a table showing one example of an event list in accordance with the first exemplary embodiment, which an event control module can hold.

FIG. 6 is a table showing an example of an event log.

FIG. 7 is a view showing one example of the Subscribe message in accordance with the second exemplary embodiment.

FIG. 8 is a table showing one example of the event list in accordance with the second exemplary embodiment, which the event control module can hold.

FIG. 11 is a table showing one example of an upper limit list.

DETAILED DESCRIPTION OF THE EMBODIMENTS

Figure 1:
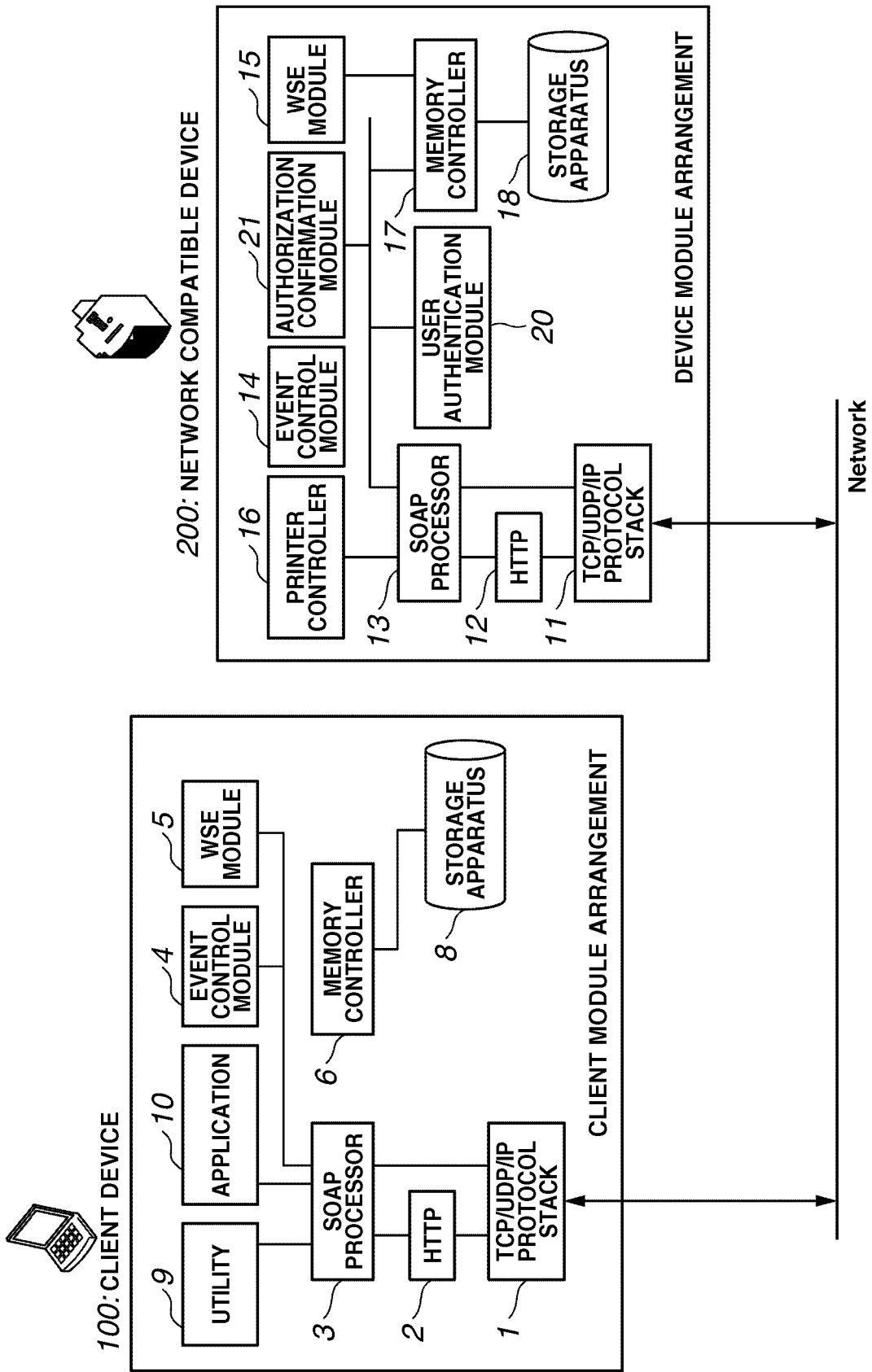
FIG. 1 is a schematic arrangement of an event registration system in accordance with one exemplary embodiment.

The following description of the numerous exemplary embodiments are merely illustrative in nature and is in no way intended to limit the present invention, its application, or uses.

It is noted that throughout the specification, similar reference numerals and letters refer to similar items in the following figures, and thus once an item is defined in one figure, it may not be discussed for following figures. Various data and numerical values representing protocol, version, address, or the like in the following exemplary embodiments are no way intended to limit the scope of the present invention. Herein now, numerous exemplary embodiments will be described in detail below with reference to the drawings.

First Exemplary Embodiment

FIG. 1 shows an exemplary schematic arrangement of an event registration system. A client device 100 has a communication function capable of complying with the Ethernet (registration trademark), and includes a TCP (Transmission Control Protocol)/UDP (User Datagram Protocol)/IP (Internet Protocol) protocol stack 1 and an HTTP 2 functioning as a host layer of the TCP/UDP/IP protocol stack 1. The client device 100 causes the TCP/UDP/IP protocol stack 1 and the HTTP 2 to analyze HTTP requests received via the network and execute necessary response processing.

Furthermore, the client device 100 includes an SOAP (Simple Object Access Protocol) processor 3 functioning as a host layer of the TCP/UDP/IP protocol stack 1 and the HTTP 2. Furthermore, the client device 100 includes an event control module 4 and a WSE (Web Service Enhancement) module 5. The event control module 4 and the WSE module 5 can realize bidirectional communications of XML (eXtensible Markup Language) data via the SOAP processor 3.

Furthermore, the event control module 4 can control various events and store information required for event registration and/or event reception into a storage apparatus 8 via a memory controller 6. Furthermore, the event control module 4 can read the information from the storage apparatus 8 or erase the information stored in the storage apparatus 8. Furthermore, the event control module 4 can issue, to the WSE module 5, a transmission request of a Subscribe message (event registration request).

The WSE module 5 can execute predetermined processing in response to a Notification message notified via the SOAP processor 3 from a network device (e.g., a network compatible device 200) and can issue a Subscribe/Unsubscribe message to the network device based on the WS-Eventing specification.

Furthermore, in response to a state transition of a registered event if occurred in the network device, the event control module 4 can send a Notification message to an application, such as a utility 9 or an application 10, which requested the event to the event control module 4.

On the other hand, the network compatible device 200 (i.e., a network compatible printer in the present exemplary embodiment) has a communication function capable of complying with the Ethernet (registration trademark) or the like and includes a TCP/UDP/IP protocol stack 11 and an HTTP 12 functioning as a host layer of the TCP/UDP/IP protocol stack 11. The network compatible device 200, including the TCP/UDP/IP protocol stack 11 and the HTTP 12, can analyze HTTP requests received via the network and execute necessary response processing for respective HTTP requests.

Furthermore, the network compatible device 200 includes a SOAP processor 13 functioning as a host layer of the TCP/UDP/IP protocol stack 11 and the HTTP 12. Furthermore, the network compatible device 200 includes an event control module 14, a WSE module 15, and a printer controller 16. The event control module 14, the WSE module 15, and the printer controller 16 can realize bidirectional communications of XML data via the SOAP processor 13. The device 200 also includes a memory controller 17 and a storage apparatus 18.

The WSE module 15 can execute various processing when connected to the network, via the SOAP processor 13, for example according to the WS-Eventing specification. For example, the WSE module 15 can execute the processing responding to a Subscribe message issued from the client device 100 for registering an event, the processing responding to an Unsubscribe message issued when the registered event is deleted, and the processing notifying a Notification message issued for notifying an event.

A user authentication module 20 can authenticate a user certificate attached to the Subscribe message transmitted from the client device 100 with reference to a certificate that the network compatible device 200 can hold, or a certificate obtainable via the network from a route certification agency. In practice, the user authentication module 20 can execute the authentication processing using a challenge-response method.

An authorization confirmation module 21 can determine whether a user authenticated by the user authentication module 20 has a registration right of an event with respect to the "Subscribe," or can determine whether an event notification rate (event notification interval) with respect to the "Subscribe" is within a permitted range. In the exemplary embodiment, to confirm the registration right, the authorization confirmation module 21 can manage the authorization information of each user and can inquire a user management server connected via the network about necessary information.

Figure 2:
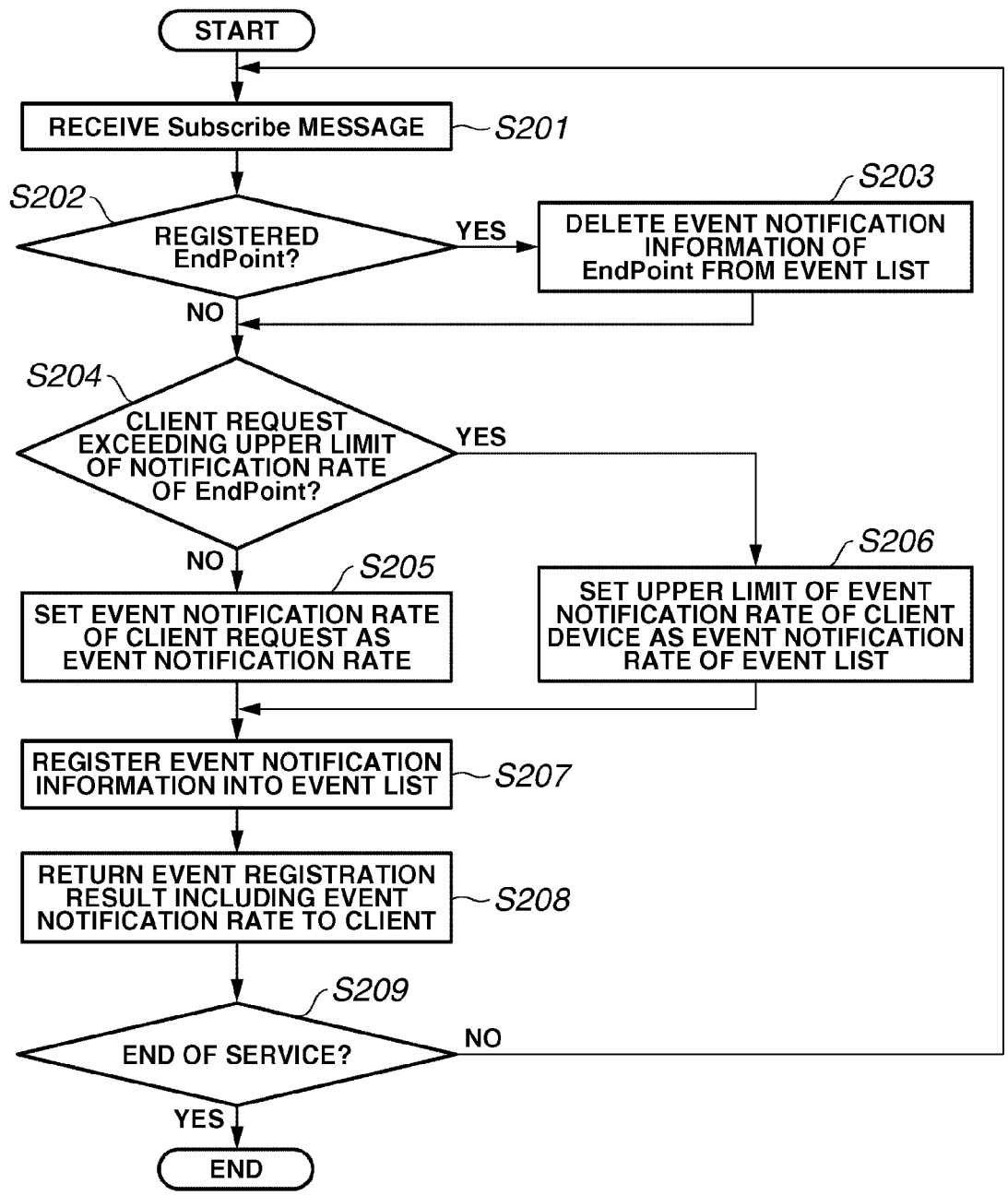
FIG. 2 is a flowchart showing one example of event registration processing in accordance with a first exemplary embodiment of the present invention.

FIG. 2 is a flowchart showing one example of event registration processing in accordance with a first exemplary embodiment of the present invention. The event control module 14 can control the event as described below and can store information required for event registration or event reception in a storage apparatus 18 via a memory controller 17, or can read the information from the storage apparatus 18 or erase the information of the storage apparatus 18.

In step S201 of FIG. 2, the network compatible device 200 receives a Subscribe message. FIG. 3 is one example of the Subscribe message in accordance with the first exemplary embodiment. As shown in FIG. 3, the Subscribe message includes an event notification rate (e.g., 3000 ms) and, as notification event, an event type and its priority (e.g., the first priority event type is "JobLog" and the second priority event type is "ImpressionCount").

The Subscribe message is then sent, via the TCP/UDP/IP protocol stack 11, to the SOAP processor 13. The SOAP processor 13 analyzes the contents of a SOAP message (Subscribe message) and sends the analyzed contents to the WSE module 15. The WSE module 15 analyzes the Subscribe message transmitted from the client device 100 and sends the analysis result to the event control module 14.

In step S202 of FIG. 2, the event control module 14 compares the analysis result received from the WSE module 15 with an event notification destination (or reply destination) address (i.e., EndPoint) already registered in the event list (or event table) being held in the event control module 14.

When an event notification address included in the analysis result received from the WSE module 15 agrees with one of event notification addresses already registered in the event list (YES in step S202), the processing flow proceeds to step S203. Otherwise, the processing flow proceeds to step S204 (NO in step S202).

In step S203 of FIG. 2, the event control module 14 deletes, from the event list, event notification information relating to the event notification address already registered in the event list, which is identical to the event notification address included in the analysis result received from the WSE module 15. Then the process flow proceeds to step S204.

FIG. 4 is a table showing one example of the event list in accordance with the first exemplary embodiment, which the event control module 14 can hold. As shown in FIG. 4, the event list includes, as practical items, a destination (i.e., event notification address) 401, an event notification rate 402, a first priority event 403, and a second priority event 404.

Returning to FIG. 2, in step S204 of FIG. 2, the event control module 14 compares the event notification rate included in the Subscribe message transmitted from the client device 100 with an upper limit of the event notification rate being set for the event notification destination (i.e., the client device), to determine whether the request of the client device 100 is less than the upper limit and within an event notification feasible range.

In the present exemplary embodiment, the event control module 14 can hold and manage a list including, for example, upper limit values of the event notification rate being set for respective client devices. Furthermore, the event control module 14 can obtain an event notification rate included in the Subscribe message from the analysis result received from the WSE module 15.

When the request of the client device 100 is less than the upper limit and within the event notification feasible range (NO in step S204), the processing flow proceeds to step S205. On the other hand, when the request of the client device 100 exceeds the upper limit and is not within the event notification feasible range, the processing flow proceeds to step S206 (YES in step S204).

In step S205 of FIG. 2, the event control module 14 (i.e., one example of the setting unit) sets the event notification rate of the request sent from the client device 100 as an event notification rate.

On the other hand, in the step S206 of FIG. 2, the event control module 14 sets the upper limit of the event notification rate of the client device 100 as an event notification rate of the event list. In the step S206, it is also possible that the event control module 14 executes error processing for informing that the event notification rate included in the Subscribe message cannot be set in the event list and cancels the settings of the event notification rate.

In step S207 the event control module 14 registers the corresponding event notification information: i.e., the event notification address (i.e., item 401 of FIG. 4); the event notification rate (i.e., item 402 of FIG. 4); and the event priority (i.e., items 403 and 404 of FIG. 4), into the event list.

In step S208, in response to a request from the event control module 14, the SOAP processor 13 generates a SubscribeResponse message, for example, according to the WS-Eventing specification, and transmits, by unicast, the SubscribeResponse message to the client via the TCP/UDP/IP protocol stack 11. In this case, the SubscribeResponse message includes the information relating to the event notification rate determined (set) by the network compatible device 200.

In step S209, the event control module 14 determines whether the event (event information) registration processing should be completed. When the registration processing should be finished (YES in step S209), the event control module 14 terminates this processing routine. Otherwise, the processing flow returns to step S201 to again receive a Subscribe message (YES in step S209).

Figure 5:
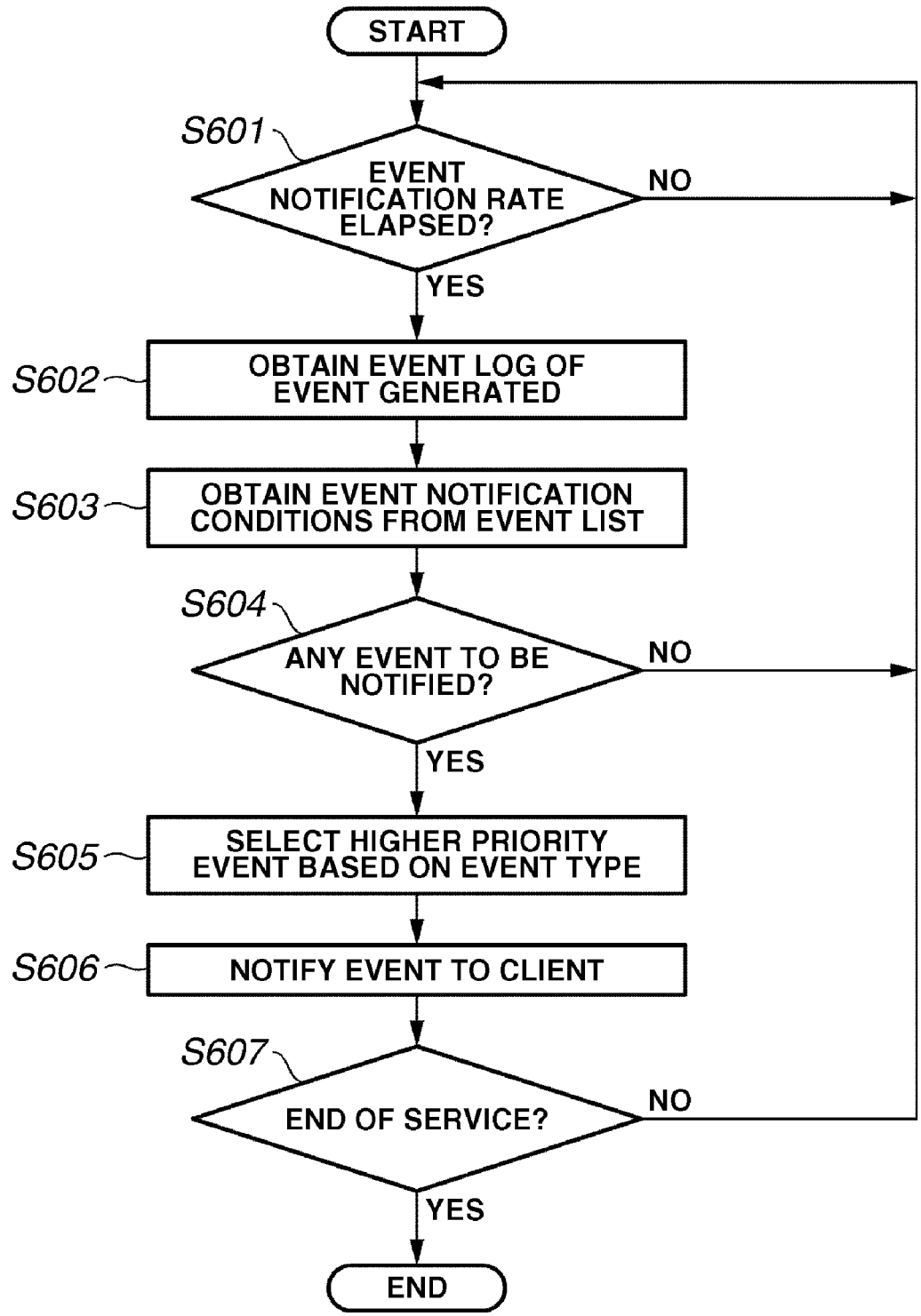
FIG. 5 is a flowchart showing one example of event message transmission processing in accordance with the first exemplary embodiment.

FIG. 5 is a flowchart showing one example of event message transmission processing according to the first exemplary embodiment. In step S601, the event control module 14 determines whether the event notification rate being set for the client device 100 has elapsed, with reference to the event list. When the event notification rate has already elapsed (YES in step S601), the processing flow proceeds to step S602. Otherwise, the event control module 14 repeats the processing of the step S601 (NO in step S601).

In step S602 of FIG. 5, the event control module 14 obtains an event log of an event generated within a duration defined by the event notification rate. FIG. 6 is a table showing a practical example of the event log. As shown in FIG. 6, the event log includes, as practical items, an event generation time 501, an event type 502 indicating the type of event, and an event status 503 indicating the state of event. The exemplary event log shown in FIG. 6 includes ten events generated within the duration defined by the event notification rate.

Returning to FIG. 5, in step S603 the event control module 14 obtains event notification conditions (i.e., conditions of an event notified to the client device 100) with reference to the event list being held in the event control module 14. The event notification conditions, for example, include event priority information (i.e., items 403 and 404 of FIG. 4) registered with respect to the "Subscribe".

In step S604 the event control module 14 determines whether there is any event to be notified to the client device 100, based on the event log obtained in the step S602 and the event notification conditions obtained in the step S603. When the event to be notified to the client device 100 is present (YES in step S604), the processing flow proceeds to step S605. Otherwise, the processing flow returns to the step S601 (NO in step S604).

In step S605 the event control module 14 selects an event having a higher priority, as an event to be notified to the client device 100, based on the event type included in the event log, with reference to the event notification conditions. For example, according to the example of FIG. 4, the first priority event 403 is "JobLog" and the second priority event 404 is "Impression." Therefore, the event control module 14 selects the "JobLog" (i.e., a ninth event according to the example of the event log shown in FIG. 6) as an event to be notified to the client device 100. Furthermore, the event control module 14 sends the information relating to a port 1028 having an address 192.168.10.100, as additional information relating to the notification destination, to the WSE module 15.

In step S606 the event control module 14 sends, to the WSE module 15, the event to be notified to the client device 100. To transmit an Event notification message (i.e., event message) to the client device 100, the WSE module 15 requests the SOAP processor 13 to issue the Event notification message which is, for example, regulated according to the WS-Eventing specification. The SOAP processor 13 transmits the Event notification message to the client device 100.

In step S607 of FIG. 5, the event control module 14 determines whether the event message transmission processing should be terminated. When the event message transmission processing should be terminated, the event control module 14 terminates the event message transmission processing (YES in step S607). Otherwise, the processing flow returns to step S601 (NO in step S607).

Second Exemplary Embodiment

According to the first exemplary embodiment, the Subscribe message includes the event type as an event to be notified. On the other hand, the second exemplary embodiment is characterized in that the Subscribe message includes, as an event to be notified, an event status in addition to the event type.

FIG. 7 shows one example of the Subscribe message in accordance with the second exemplary embodiment. As shown in FIG. 7, the Subscribe message includes an event notification rate (e.g., 3000 ms), an event type, an event status, and an event priority.

According to the example of FIG. 7, the first priority event/status is "job state transition: print finished" and the second priority event/status is "job state transition: any (i.e., other than print finished)."

FIG. 8 is a table showing one example of the event list in accordance with the second exemplary embodiment, which the event control module 14 can hold. As shown in FIG. 8, the event list includes, as practical items, a destination (i.e., event notification address) 801, an event notification rate 802, a first priority event/status 803, and a second priority event/status 804.

When the event control module 14 receives the Subscribe message shown in FIG. 7, the event control module 14 executes the processing of FIG. 2 described in the first exemplary embodiment and registers, into the event list, corresponding event notification information, i.e., the event notification address (i.e., item 801 of FIG. 8), the event notification rate (i.e., item 802 of FIG. 8), and the event priority (i.e., items 803 and 804 of FIG. 8).

Figure 9:
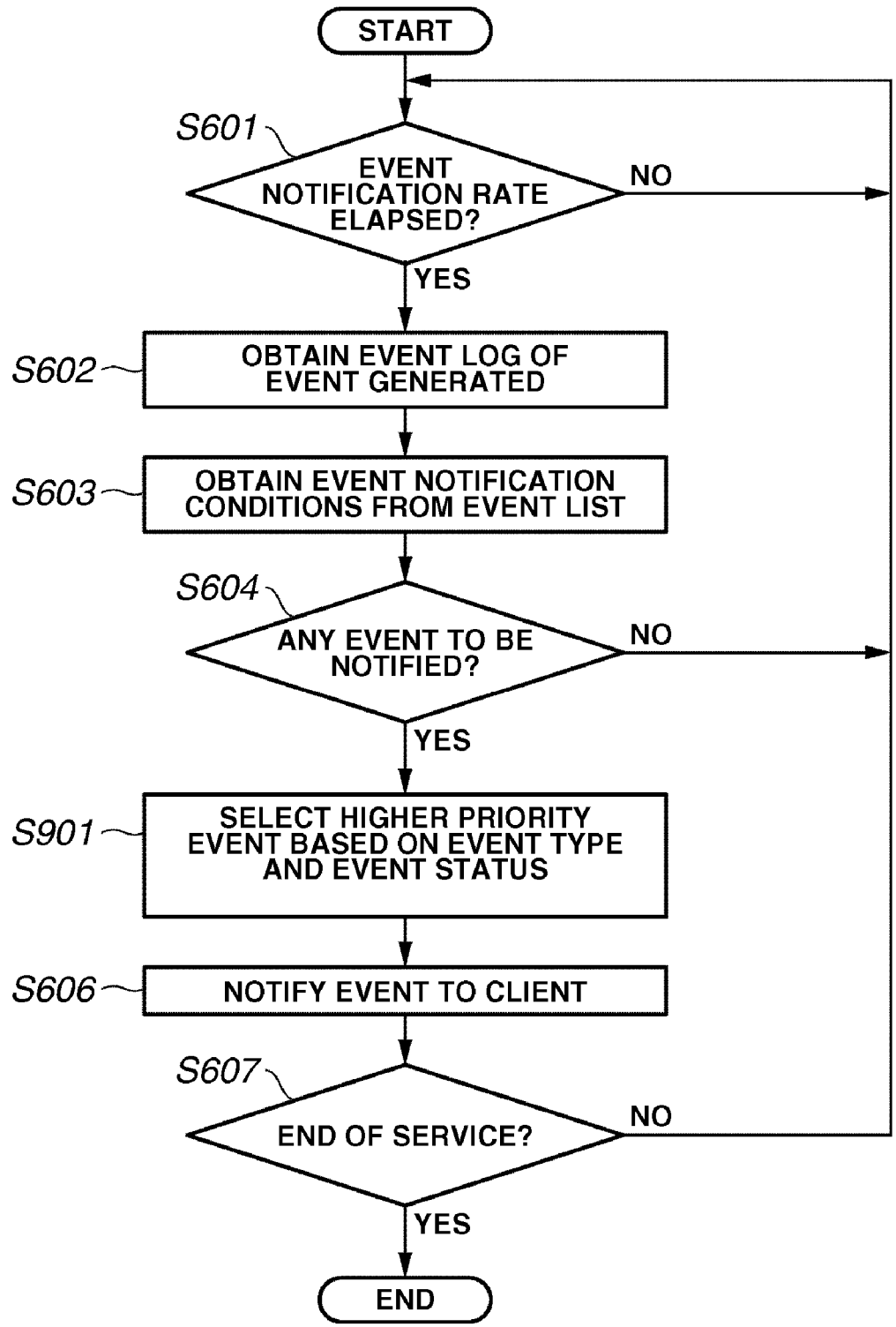
FIG. 9 is a flowchart showing one example of the event message transmission processing in accordance with the second exemplary embodiment.

FIG. 9 is a flowchart showing one example of the event message transmission processing according to the second exemplary embodiment. The processing performed in step S601 and step S602 of FIG. 9 is similar to the processing of the step S601 and step S602 of FIG. 5 and will not be described below.

In step S603 the event control module 14 obtains event notification conditions (i.e., conditions of an event to be notified to the client device 100) with reference to the event list being held in the event control module 14. The event notification conditions include, as event priority information registered with respect to the "Subscribe", the event type and the event status.

In step S604 the event control module 14 determines whether there is any event to be notified to the client device 100 based on the event log obtained in the step S602 and the event notification conditions obtained in the step S603. When the event to be notified to the client device 100 is present (YES in step S604), the processing flow proceeds to step S901. Otherwise, the processing flow returns to the step S601 (NO in step S604).

In step S901, the event control module 14 selects an event having a higher priority, as an event to be notified to the client device 100, based on the event type and the event status included in the event log, with reference to the event notification conditions.

For example, according to the example of FIG. 8, the first priority event/status 803 is "job state transition: print finished" and the second priority event/status 804 is "job state transition: any." Therefore, the event control module 14 selects the job log (i.e., a third event according to the example of the event log shown in FIG. 6) as an event to be notified to the client device 100.

Furthermore, the event control module 14 sends the information relating to a port 1028 having an address 192.168.10.100, as additional information relating to the notification destination, to the WSE module 15. More specifically, the event control module 14 determines a notification event based on priority information being set for respective events, from the events included in the event log that records all events generated during a predetermined notification interval (i.e., during a period of time defined by the event notification rate).

Also, the processing performed in step S606 and step S607 of FIG. 9 is similar to the processing of the step S606 and step S607 of the FIG. 5 and will not be described below.

Third Exemplary Embodiment

The third exemplary embodiment is characterized in that the client device 100 sends a user certificate (i.e., user authentication information) to the network compatible device 200 and the network compatible device 200 can manage the event notification rate for each user.

Figure 10:
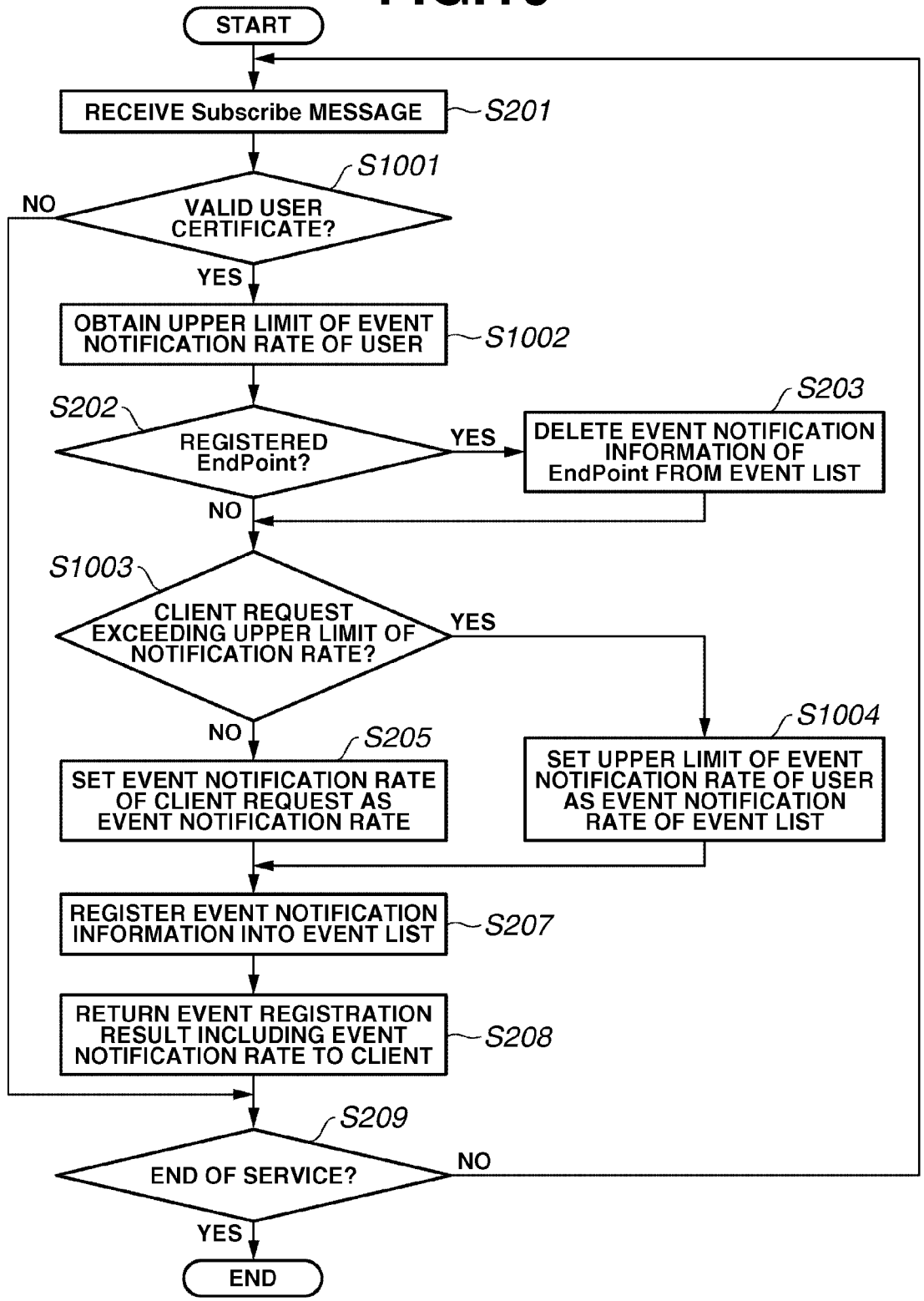
FIG. 10 is a flowchart showing one example of the event registration processing in accordance with a third exemplary embodiment.

FIG. 10 is a flowchart showing one example of the event registration processing according to the third exemplary embodiment. In step S201 of FIG. 10, the network compatible device 200 receives a Subscribe message including a user certificate. The received Subscribe message is then sent via the TCP/UDP/IP protocol stack 11 to the SOAP processor 13. The SOAP processor 13 analyzes the contents of a SOAP message (i.e., Subscribe message) and notifies the analysis result to the WSE module 15. The WSE module 15 analyzes the Subscribe message transmitted from the client device 100 and sends the user certificate to the user authentication module 20.

In step S1001, the user authentication module 20 authenticates the received user certificate with reference to a certificate that the network compatible device 200 can hold, or a certificate obtainable via the network from the route certification agency. When user certificate is valid (YES in step S1001), the processing flow proceeds to step S1002. When the user certificate is invalid, the processing flow proceeds to step S209 (NO in step S1001). In practice, the user authentication module 20 can execute the authentication processing using a challenge-response method.

In step S1002, the authorization confirmation module 21 obtains an upper limit of the event notification rate being set for the "Subscribe", which is permitted for the user having been authenticated by the user authentication module 20.

FIG. 11 is a table showing one example of the upper limit list of the event notification rate which the authorization confirmation module 21 can hold and manage for each user. The upper limit list includes, as practical items, a user 1101 discriminating a user and an upper limit of event notification rate 1102. The authorization confirmation module 21 sends the obtained upper limit of the event notification rate to the event control module 14.

Next, in step S202 of FIG. 2, the event control module 14 compares the analysis result received from the WSE module 15 with the event notification destination (or reply destination) address (EndPoint) already registered in the event list (or event table) being held in the event control module 14.

When an event notification address included in the analysis result received from the WSE module 15 agrees with one of event notification addresses already registered in the event list, the processing flow proceeds to step S203 (YES in step S202). Otherwise, the processing flow proceeds to step S1003 (NO in step S202).

In step S203 of FIG. 10, the event control module 14 deletes, from the event list, event notification information relating to the event notification address already registered in the event list, which is identical to the event notification address included in the analysis result received from the WSE module 15.

On the other hand, in the step S1003 of FIG. 10, the event control module 14 compares the upper limit of the event notification rate received from the authorization confirmation module 21 with the upper limit of the event notification rate being set for a corresponding user, to determine whether the request of the client device 100 is less than the upper limit and within an event notification feasible range.

When the request of the client device 100 is less than the upper limit and within the event notification feasible range, the processing flow proceeds to step S205 (NO in step S1003). Otherwise, the processing flow proceeds to step S1004 (YES in step S1003).

In step S205 of FIG. 10, the event control module 14 sets the event notification rate of the request sent from the client device 100 as an event notification rate.

On the other hand, in the step S1004 of FIG. 2, the event control module 14 sets the upper limit of the event notification rate of the corresponding user as an event notification rate of the event list. In the step S1004 of FIG. 10, the event control module 14 can execute error processing for informing that the event notification rate included in the Subscribe message cannot be set in the event list and cancel the settings of the event notification rate.

The processing performed in step S207 through step S209 of FIG. 10 is similar to the processing of the step S207 through step S209 of the FIG. 2 and will not be described below.

Figure 12:
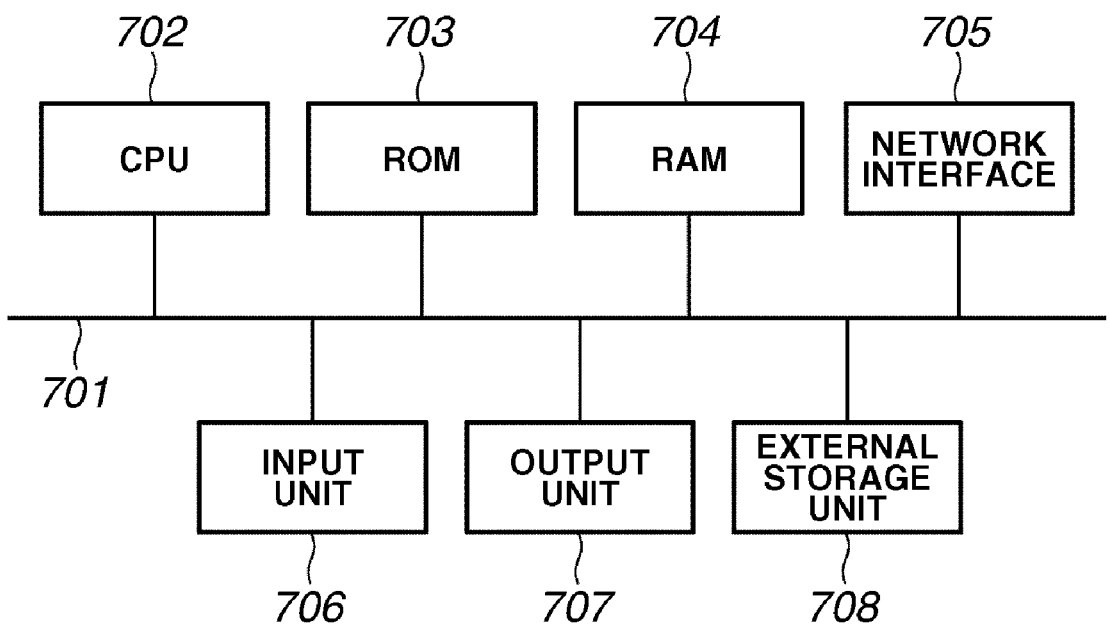
FIG. 12 is a block diagram showing one example of a hardware arrangement that can realize the exemplary embodiment.

FIG. 12 is a block diagram showing an exemplary hardware arrangement of the client device 100, which includes a central processing unit (CPU) 702, a ROM 703, a RAM 704, a network interface 705, an input unit 706, an output unit 707, and an external storage unit 708, which are connected to a bus 701.

The ROM 703 can store the control procedure (i.e., computer programs) of the CPU 702. The CPU 702 can execute the computer programs stored in the ROM 703 for start-up. The external storage unit 708 can store computer programs. The computer programs of the external storage unit 708 can be loaded to the RAM 704 so that the CPU 702 can execute the loaded programs.

The external storage unit 708 is, for example, a hard disk storage device or a CD-ROM. These media can hold the storage contents even when a power source is turned off.

The RAM 704 can function as a work memory that can input/output data and/or transmit/receive data, or a temporary storage that can store control data of respective constituent components. The CPU 702 can execute various processing and calculations of the data in accordance with execution of the computer programs, and can control various constituent components connected via the bus 701. The client device 100 starts operation when the CPU 702 reads the computer programs from the external storage unit 708 and executes the readout programs. The external storage unit 708 can store the software module in the client device 100 shown in FIG. 1.

Furthermore, the network compatible device 200 has a hardware arrangement similar to FIG. 12, although the network compatible device 200 may include a printing unit or an image processing unit (not shown).

The external storage unit 708 stores the software module in the network compatible device 200 of FIG. 1. Furthermore, the external storage unit stores the event list of FIG. 4 and the data of FIGS. 6 and 11. The CPU installed in each device reads program(s) from the memory and executes the processing of FIGS. 2, 5, 9, and 10.

Other Exemplary Embodiments

Although the above-described exemplary embodiments are described according to the WS-Eventing specification, the present invention can be embodied in various ways without relying on the WS-Eventing specification. Furthermore, the above-described exemplary embodiments use the Ethernet (registration trademark) as one example of the network. However, the present invention can use other network.

Furthermore, according to the above-described exemplary embodiments, the network compatible device is a printer. However, the present invention is not limited to printers and can be applied to any other devices, such as scanners, facsimiles, copying machines, and storage devices, which the client device 100 can communicate via the network.

Moreover, a memory stores the program(s) and a CPU (i.e., central processing unit) can read the program(s) to realize the processing functions of the client device 100 and the network compatible device 200 described in above-described exemplary embodiments. However, it is also possible to use a dedicated hardware arrangement to realize all or part of the processing functions of the above-described exemplary embodiments.

Also, above-described memory can be constituted by a magneto-optical disk, a flash memory or other nonvolatile memory, a CD-ROM or other read-only recording medium, a volatile memory other than RAM, or a combined recording medium readable and writable by a computer.

Furthermore, program(s) for realizing the functions of the client device 100 and the network compatible device 200 can be recorded into a recording medium readable by a computer. A computer system can read the recorded program(s) from the recording medium and execute the program(s) to realize the processing.

In this case, the "computer system" includes the OS (operating system) and hardware of peripheral devices. More specifically, the program(s) of a recording medium can be written into a memory of a feature expansion board equipped in a computer or into a memory of a feature expansion unit connected to the computer. In this case, based on an instruction of the program, the CPU provided on the feature expansion board or the feature expansion unit can execute part or all of the processing so that the functions of the above-described exemplary embodiments can be realized.

Additionally, the "recording medium readable by a computer" can be a portable medium, such as flexible disk, magneto-optical disk, ROM, or CD-ROM, or a built-in storage apparatus, such as a hard disk installed in a computer system.

Still further, the "recording medium readable by a computer" can be any other media that can hold program(s) for a predetermined time, such as a volatile memory (RAM) of a computer system that can function as a server or a client for receiving program(s) transmitted via the Internet or other network, or via a telephone line or other communication line.

Furthermore, the above-described program(s) can be transmitted from the computer system storing the program(s) in its storage apparatus, via a transmission medium, or via a transmission wave in the transmission medium, to other computer system.

In this case, the "transmission medium" transmitting the program(s) is a medium having a function for transmitting information, such as the Internet network (communication network), the telephone line or other communication line.

Also, the above-described program(s) can realize a part of the above-described functions. Furthermore, the above-described program(s) can be a difference file (i.e., a difference program) capable of cooperating with the program(s) already recorded in the computer system to realize the above-described functions.

And, a program product such as a recording medium readable by a computer and storing the above-described program(s) can be an exemplary embodiment of the present invention.

The present invention encompasses the above-described program(s), the recording medium, the transmission medium, and the program product.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2005-252301 filed Aug. 31, 2005, which is hereby incorporated by reference herein in its entirety.

What is claimed:

1. A server apparatus comprising:
    a processor;
    memory;
    an event registration message reception unit configured to receive, from a client apparatus connected via a network, an event registration message relating to registration of an event to be notified;
    an event notification rate determination unit configured to determine an event notification rate to be registered based on an event notification rate relating to an interval of events to be notified, included in the event registration message;
    an event notification rate storage unit configured to store, into a storage apparatus, the event notification rate determined by the event notification rate determination unit and priority information relating to priority of an event to be notified, included in the event registration message, based on destination information of the client apparatus to which the event is notified; and
    an event notification unit configured to notify the client apparatus of information relating to an event having high priority among events generated within a time corresponding to the event notification rate, based on the event notification rate stored in the storage apparatus, the priority information, and the destination information of the client apparatus,
    wherein the priority information includes event class information discriminating the class of an event to be notified, event status information representing a state of the event, and notification priority information for each of the event class information and the event status information.

2. The server apparatus according to claim 1, wherein the priority information includes event class information discriminating the class of an event to be notified and notification priority information for each of the event class information.

3. A server apparatus comprising:
    a processor;
    memory;
    an event registration message reception unit configured to receive, from a client apparatus connected via a network, an event registration message relating to registration of an event to be notified;
    an event notification rate determination unit configured to determine an event notification rate to be registered based on an event notification rate relating to an interval of events to be notified, included in the event registration message;
    an event notification rate storage unit configured to store, into a storage apparatus, the event notification rate determined by the event notification rate determination unit and priority information relating to priority of an event to be notified, included in the event registration message, based on destination information of the client apparatus to which the event is notified; and
    an event notification unit configured to notify the client apparatus of information relating to an event having high priority among events generated within a time corresponding to the event notification rate based on the event notification rate stored in the storage apparatus, the priority information, and the destination information of the client apparatus, and
    a first upper limit storage unit configured to store an upper limit of the event notification rate for each client apparatus, wherein the event notification rate determination unit determines the event notification rate to be registered, based on the event notification rate included in the event registration message and the upper limit of the event notification rate.

4. The server apparatus according to claim 3, wherein the priority information includes event class information discriminating the class of an event to be notified and notification priority information for each of the event class information.

5. A server apparatus comprising:
    a processor;
    memory;
    an event registration message reception unit configured to receive, from a client apparatus connected via a network, an event registration message relating to registration of an event to be notified;
    an event notification rate determination unit configured to determine an event notification rate to be registered based on an event notification rate relating to an interval of events to be notified, included in the event registration message;
    an event notification rate storage unit configured to store, into a storage apparatus, the event notification rate determined by the event notification rate determination unit and priority information relating to priority of an event to be notified, included in the event registration message, based on destination information of the client apparatus to which the event is notified; and an event notification unit configured to notify the client apparatus of information relating to an event having high priority among events generated within a time corresponding to the event notification rate, based on the event notification rate stored in the storage apparatus, the priority information, and the destination information of the client apparatus;
    an authentication unit configured to authenticate a user of the client apparatus; and a second upper limit storage unit configured to store an upper limit of the event notification rate for each user of the client apparatus,
    wherein the event notification rate determination unit determines the event notification rate to be registered, based on the event notification rate included in the event registration message and the upper limit of the event notification rate.

6. The server apparatus according to claim 5, wherein the priority information includes event class information discriminating the class of an event to be notified and notification priority information for each of the event class information.

7. An event notification method for a server apparatus connected via a network to a client apparatus, the method comprising:
    receiving, from a client apparatus, an event registration message relating to registration of an event to be notified;
    determining an event notification rate to be registered based on an event notification rate relating to an interval of events to be notified, included in the event registration message;

storing, into a storage apparatus, the event notification rate determined in the event notification rate determination step and priority information relating to priority of an event to be notified, included in the event registration message, based on destination information of the client apparatus to which the event is notified; and notifying the client apparatus of information relating to an event having high priority among events generated within a time corresponding to the event notification rate, based on the event notification rate stored in the storage apparatus, the priority information, and the destination information of the client apparatus, wherein the priority information includes event class information discriminating the class of an event to be notified, event status information representing a state of the event, and notification priority information for each of the event class information and the event status information.

8. The event notification method according to claim 7, wherein the priority information includes event class information discriminating the class of an event to be notified and notification priority information for each of the event class information.

9. An event notification method for a server apparatus connected via a network to a client apparatus, the method comprising:

receiving, from a client apparatus, an event registration message relating to registration of an event to be notified;

determining an event notification rate to be registered based on an event notification rate relating to an interval of events to be notified, included in the event registration message;

storing, into a storage apparatus, the event notification rate determined in the event notification rate determination step and priority information relating to priority of an event to be notified, included in the event registration message, based on destination information of the client apparatus to which the event is notified; and notifying the client apparatus of information relating to an event having high priority among events generated within a time corresponding to the event notification rate, based on the event notification rate stored in the storage apparatus, the priority information, and the destination information of the client apparatus, wherein the event notification rate determination step includes determining the event notification rate to be registered based on the event notification rate included in the event registration message and an upper limit of the event notification rate being set for each client apparatus.

10. The event notification method according to claim 9, wherein the priority information includes event class information discriminating the class of an event to be notified and notification priority information for each of the event class information.

11. An event notification method for a server apparatus connected via a network to a client apparatus, the method comprising:

receiving, from a client apparatus, an event registration message relating to registration of an event to be notified;

determining an event notification rate to be registered based on an event notification rate relating to an interval of events to be notified, included in the event registration message;

storing, into a storage apparatus, the event notification rate determined in the event notification rate determination step and priority information relating to priority of an event to be notified, included in the event registration message, based on destination information of the client apparatus to which the event is notified; and notifying the client apparatus of information relating to an event having high priority among events generated within a time corresponding to the event notification rate, based on the event notification rate stored in the storage apparatus, the priority information, and the destination information of the client apparatus; and authenticating a user of the client apparatus, wherein the event notification rate determination step includes determining the event notification rate to be registered based on the event notification rate included in the event registration message and an upper limit of the event notification rate being set for each user of the client apparatus.

12. The event notification method according to claim 11, wherein the priority information includes event class information discriminating the class of an event to be notified and notification priority information for each of the event class information.

13. A computer-readable medium storing a computer-executable program of instructions for causing a computer to perform the method according to claim 7.

14. A computer-readable medium storing a computer-executable program of instructions for causing a computer to perform the method according to claim 9.

15. A computer-readable medium storing a computer-executable program of instructions for causing a computer to perform the method according to claim 11.

* * * * *